United States Patent
Zhu et al.

(10) Patent No.: US 11,171,748 B2
(45) Date of Patent: Nov. 9, 2021

(54) INDICATING RESOURCES FOR TRANSMITTING MODULATION SYMBOLS

(71) Applicant: Motorola Mobility LLC, Chicago, IL (US)

(72) Inventors: Chenxi Zhu, Fairfax, VA (US); Tyler Brown, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/789,773

(22) Filed: Oct. 20, 2017

(65) Prior Publication Data

US 2018/0323920 A1 Nov. 8, 2018

Related U.S. Application Data

(60) Provisional application No. 62/501,969, filed on May 5, 2017.

(51) Int. Cl.
*H04L 5/00* (2006.01)
*H04W 72/04* (2009.01)

(52) U.S. Cl.
CPC .......... *H04L 5/0016* (2013.01); *H04L 5/0026* (2013.01); *H04L 5/0044* (2013.01); *H04W 72/0446* (2013.01); *H04L 5/0023* (2013.01); *H04L 5/0053* (2013.01); *H04W 72/042* (2013.01); *H04W 72/046* (2013.01); *H04W 72/0453* (2013.01)

(58) Field of Classification Search
CPC ... H04L 5/0016; H04L 5/0023; H04L 5/0026; H04L 5/0044; H04L 5/0053; H04W 72/0446; H04W 72/042; H04W 72/0453; H04W 72/046
See application file for complete search history.

(56) References Cited

U.S. PATENT DOCUMENTS

| | | | | |
|---|---|---|---|---|
| 9,331,816 | B2 * | 5/2016 | Lee | H04L 1/1861 |
| 9,749,109 | B2 * | 8/2017 | Lee | H04L 5/0007 |
| 2010/0215007 | A1 * | 8/2010 | Zhang | H04L 1/0071 370/329 |
| 2014/0044085 | A1 * | 2/2014 | Hong | H04L 5/0037 370/329 |
| 2018/0234881 | A1 * | 8/2018 | Hosseini | H04W 28/04 |
| 2018/0242306 | A1 * | 8/2018 | Wong | H04W 76/10 |
| 2018/0270705 | A1 * | 9/2018 | Sun | H04L 1/1657 |
| 2018/0278368 | A1 * | 9/2018 | Kim | H04L 1/1829 |
| 2018/0302191 | A1 * | 10/2018 | Park | H04L 1/1614 |

(Continued)

OTHER PUBLICATIONS

NTT DOCOMO, "Discussion on Codeword Mapping", 3GPP TSG RAN WG1 Meeting #88bis R1-1705715, Apr. 3-7, 2017, pp. 1-4.

(Continued)

*Primary Examiner* — Jeffrey M Rutkowski
*Assistant Examiner* — Jasper Kwoh
(74) *Attorney, Agent, or Firm* — Kunzler Bean & Adamson

(57) ABSTRACT

Apparatuses, methods, and systems for indicating resources for transmitting modulation symbols corresponding to sequential data of a code block group are disclosed. One apparatus includes a transmitter that: transmits information indicating time and frequency domain resources for modulation symbols corresponding to sequential data of a code block group; and transmits the modulation symbols.

18 Claims, 9 Drawing Sheets

(56) References Cited

U.S. PATENT DOCUMENTS

| | | | | |
|---|---|---|---|---|
| 2018/0317213 | A1* | 11/2018 | Islam | H04W 72/0406 |
| 2018/0324779 | A1* | 11/2018 | Li | H04W 72/044 |
| 2020/0021401 | A1* | 1/2020 | Guan | H04L 1/1896 |
| 2020/0059341 | A1* | 2/2020 | Zhang | H04L 5/0023 |
| 2020/0145141 | A1* | 5/2020 | Park | H04L 5/00 |

OTHER PUBLICATIONS

International Searching Authority PCT/US2018/031214, "Notification of Transmittal of the International Search Report and the Written opinion of the International Searching Authority, or the Declaration", dated Jul. 23, 2018, pp. 1-12.

Samsung, "TB/CB Handling for eMBB", 3GPP TSG RAN WG1 NR Ad-Hoc Meeting R1-1700958, Jan. 16-20, 2017, pp. 1-6.

ZTE, "Codeword to layer mapping and interleaving", 3GPP TSG RAN WG1 Meeting #88bis, R1-1704390, Apr. 3-7, 2017, pp. 1-10.

Huawei, "Codeword to layer mapping in NR", 3GPP TSG RAN WG1 Meeting # 88bis, R1-1705073, Apr. 3-7, 2017, pp. 1-9.

Samsung. "Open Issues on Layer Mapping", 3GPP TSG RAN WG1 88bis, R1-1705333, Apr. 3-7, 2017, pp. 1-7.

Qualcomm Incorporated, "CW to layer mapping and frequency domain interleaving", 3GPP TSG RAN WG1 #88bis, R1-1705574, R1-1705574, Apr. 3-7, 2017, pp. 1-16.

Ericsson, "Codeword to layer mapping for DL and UL", 3GPP TSG-RAN WG1 #88bis, R1-1705883, Apr. 3-7, 2017, pp. 1-5.

ETSI, "5G; Study on Scenarios and Requirements for Next Generation Access Technologies", #GPP TR 38.913 v. 14.2.0, Release 14, May 2017, pp. 1-41.

ETSI, LTE, LTE; Evolved Universal Terrestrial Radio Access (E-UTRA); Physical channels and modulation (3GPP TS 36.211 version 9.0.0 Release 9), Jan. 2010, pp. 1-87.

* cited by examiner

Codeword
200

INDICATING RESOURCES FOR TRANSMITTING MODULATION SYMBOLS

CROSS-REFERENCES TO RELATED APPLICATIONS

This application claims the benefit of U.S. Provisional Patent Application No. 62/501,969 entitled CBG-BASED RESOURCE GROUPING AND RE MAPPING FOR 5G NR TRAFFICE CHANNEL and filed on May 5, 2017 for Chenxi Zhu et al., which is incorporated herein by reference in its entirety.

FIELD

The subject matter disclosed herein relates to generally to wireless communications and more particularly relates to indicating resources for transmitting modulation symbols.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Code Block ("CB"), Code Block Group ("CBG"), Clear Channel Assessment ("CCA"), Cyclic Prefix ("CP"), Cyclical Redundancy Check ("CRC"), Channel State Information ("CSI"), Common Search Space ("CSS"), Demodulation RS ("DMRS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, code block groups may be used. In such networks, resources for transmitting modulation symbols of code block groups may not be defined.

BRIEF SUMMARY

Apparatuses for indicating resources for transmitting modulation symbols are disclosed. Methods and systems also perform the functions of the apparatus. In one embodiment, the apparatus includes a transmitter that: transmits information indicating time and frequency domain resources for modulation symbols corresponding to sequential data of a code block group; and transmits the modulation symbols.

In one embodiment, the information is indicated by radio resource control signaling, downlink control information signaling, or a combination thereof. In a further embodiment, the information includes resource group configurations indicated by radio resource control signaling and a selected resource group configuration indicated by downlink control information signaling.

In certain embodiments, the modulation symbols occupy a portion of the time resources in a transmission block and all frequency resources in the transmission block. In various embodiments, the portion of the time resources includes at least two adjacent orthogonal frequency division multiplexed symbols. In some embodiments, the portion of the time resources includes adjacent time resources.

In one embodiment, the modulation symbols occupy all spatial resources in the transmission block. In such embodiments, the modulation symbols occupy a portion of the time resources in a transmission block and a portion of the frequency resources in the transmission block. In a further embodiment, the portion of the time resources includes adjacent time resources. In certain embodiments, the portion of the time resources includes at least two adjacent orthogonal frequency division multiplexed symbols.

In various embodiments, the modulation symbols occupy a portion of the spatial resources in the transmission block. In some embodiments, the portion of the frequency resources includes at least one physical resource block. In certain embodiments, the sequential data includes a first data having a corresponding first modulation symbol occupying a first time-frequency resource and a second data having a corresponding second modulation symbol occupying a second time-frequency resource. The sequential data may be mapped and/or interleaved using any suitable manner, such as a time-frequency interleaving scheme, a time interleaving scheme, a frequency interleaving scheme, or another type of mapping.

A method for indicating resources for transmitting modulation symbols, in one embodiment, includes transmitting information indicating time and frequency domain resources for modulation symbols corresponding to sequential data of a code block group. In various embodiments, the method includes transmitting the modulation symbols.

One apparatus for receiving modulation symbols includes a receiver that: receives modulation symbols corresponding to sequential data of a code block group; and receives information indicating time and frequency domain resources for the modulation symbols. In some embodiments, the apparatus includes a processor that: demodulates the modulation symbols to form a set of demodulated symbols; and deinterleaves the set of demodulated symbols to form coded data.

In certain embodiments, the processor decodes the coded data. In various embodiments, the information is indicated by radio resource control signaling, downlink control information signaling, or a combination thereof.

In some embodiments, the information includes resource group configurations indicated by radio resource control signaling and a selected resource group configuration indicated by downlink control information signaling. In one embodiment, the modulation symbols occupy a portion of the time resources in a transmission block and all frequency resources in the transmission block. In a further embodiment, the portion of the time resources includes at least two adjacent orthogonal frequency division multiplexed symbols. In certain embodiments, the portion of the time resources includes adjacent time resources.

In various embodiments, the modulation symbols occupy all spatial resources in the transmission block. In some embodiments, the modulation symbols occupy a portion of the time resources in a transmission block and a portion of the frequency resources in the transmission block. In certain embodiments, the portion of the time resources includes adjacent time resources. In various embodiments, the portion of the time resources includes at least two adjacent orthogonal frequency division multiplexed symbols. In some embodiments, the modulation symbols occupy a portion of the spatial resources in the transmission block. In certain embodiments, the portion of the frequency resources includes at least one physical resource block. In certain embodiments, the sequential data includes a first data having a corresponding first modulation symbol occupying a first time-frequency resource and a second data having a corresponding second modulation symbol occupying a second time-frequency resource. The sequential data may be mapped and/or interleaved using any suitable manner, such as a time-frequency interleaving scheme, a time interleaving scheme, a frequency interleaving scheme, or another type of mapping.

A method for receiving modulation symbols, in one embodiment, includes receiving modulation symbols corresponding to sequential data of a code block group. In certain embodiments, the method includes receiving information indicating time and frequency domain resources for the modulation symbols. In various embodiments, the method includes demodulating the modulation symbols to form a set of demodulated symbols. In some embodiments, the method includes deinterleaving the set of demodulated symbols to form coded data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a schematic block diagram illustrating one embodiment of a codeword;

DETAILED DESCRIPTION

Figure 1:
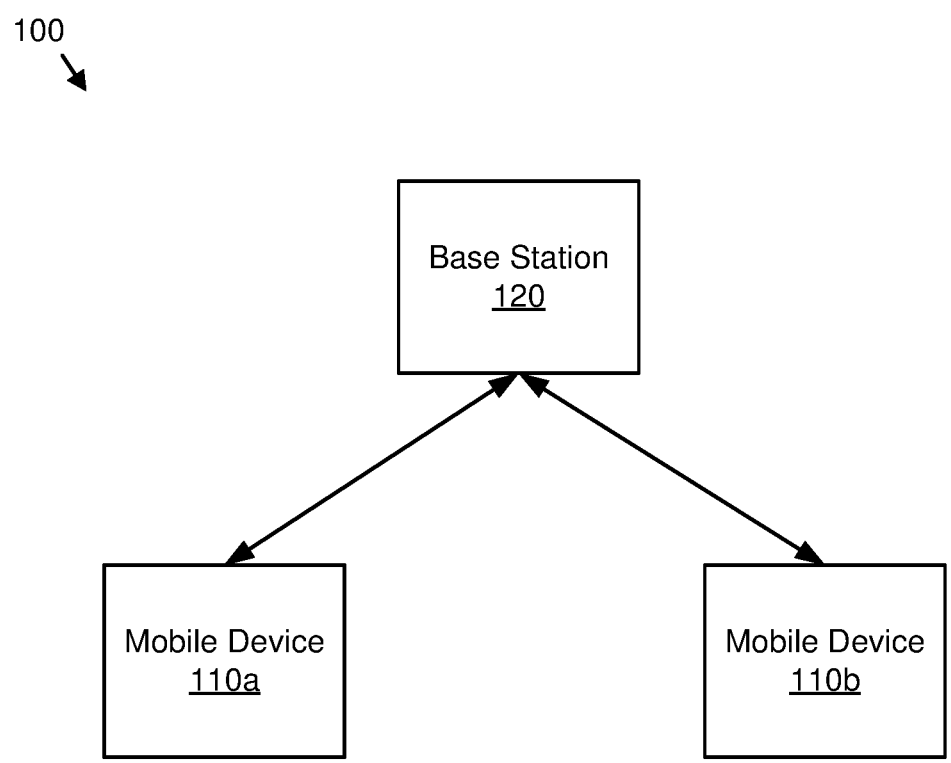
FIG. 1 is a schematic block diagram illustrating one embodiment of a communication system for transmitting and/or receiving modulation symbols.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a communication system 100 for transmitting and/or receiving modulation symbols. The system 100 includes a base station 120 and one or more mobile device 110. The mobile device 110 may communicate with the base station 120 on the cells of a cell groups associated with the base stations 120. The cell groups may be associated with a gNodeB ("gNB") base station 120, i.e. New Radio ("NR") base station 120, or an enhanced evolved node B ("eNB") Long Term Evolution ("LTE") base station 120. The mobile device 110 may be a mobile telephone, a machine-type communications ("MTC") device, a tablet computer, a laptop computer, and embedded communication devices in automobiles, kiosks, appliances, and the like.

In one embodiment, a base station 120 (or mobile device 110) may transmit information indicating time and frequency domain resources for modulation symbols corresponding to sequential data of a code block group. In certain embodiments, the base station 120 may transmit the modulation symbols. Accordingly, a base station 120 may be used for indicating resources for transmitting modulation symbols.

In one embodiment, a mobile device 110 (or base station 120) may receive modulation symbols corresponding to sequential data of a code block group. In certain embodiments, the mobile device 110 may receive information indicating time and frequency domain resources for the modulation symbols. In one embodiment, the mobile device 110 may demodulate the modulation symbols to form a set of demodulated symbols. In some embodiments, the mobile device 110 may deinterleave the set of demodulated symbols to form coded data. Accordingly, a mobile device 110 may be used for receiving modulation symbols.

Figure 2:
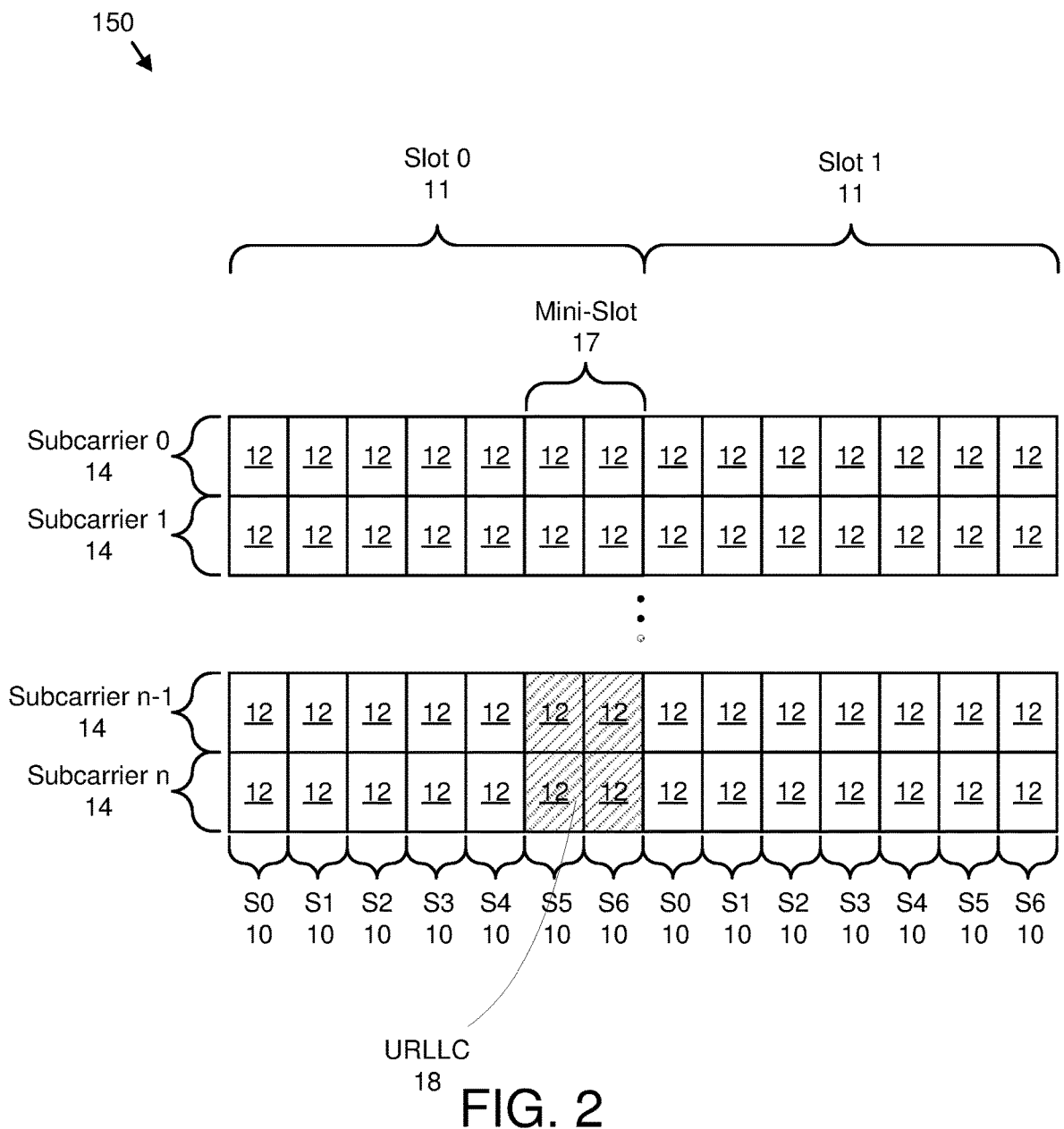
FIG. 2 is a schematic block diagram illustrating one embodiment of a transmission data.

FIG. 2 is a schematic block diagram illustrating one embodiment of transmission data 150. The transmission data 150 may carry communications between the base station 120 and the mobile device 110. In the depicted embodiment, the transmission data 150 includes one or more slots 11. Each slot 11 may include one or more Orthogonal Frequency-Division Multiplexing ("OFDM") symbols 10 in a time domain and one or more subcarrier frequencies 14 in a frequency domain. A plurality of subcarrier frequencies 14 may form a Physical Resource Block ("PRB"). A given OFDM symbol 10 at a given subcarrier frequency 14 defines a resource element 12. In one embodiment, a slot 11 may include one or more mini-slots 17.

In both Uplink ("UL") and Downlink ("DL") communications of a Fifth Generation ("5G") NR, an enhanced Mobile Broadband ("eMBB") transmission from a first mobile device 110a may suffer from an Ultra-Reliable Low Latency Communications ("URLLC") transmission 18 from a second mobile device 110b occupying a mini-slot 17. The interfering URLLC transmission 18 may be contained in smaller regions in the time and frequency resources, such as one or two OFDM symbols 10 and a smaller number of PRB than the eMBB transmission.

Because the URLLC transmission 18 in mini-slot 17 occupies a small number of consecutive OFDM symbols 10 in the time domain and a small number of PRBs in the frequency domain, the eMBB transmission suffers (e.g., either suffers strong interference or is punctured) only in these impacted resources. If these affected OFDM symbols 10 are used to transport many consecutive coded bits (e.g., or equivalently, modulation symbols) of a codeword, the decoder is expected to perform poorly, even if the coded bits transmitted in resources not impacted by interference are unaffected. If the affected coded bits are isolated and scattered more or less evenly, the decoder may have a good chance to decode the codeword successfully, or at least degrade gracefully according to the effective Signal-to-Interference-plus-Noise-Ratio ("SINK") of the codeword.

In certain embodiments, if the modulation symbols from a same code block ("CB") span all the OFDM symbols in the time domain, the receiver has to wait till the end of the transmission slot (or mini-slot) before it can start decoding the CB. In such embodiments, this may be cause unnecessary delay at the decoder. In some embodiments, the demodulation reference signal ("DMRS") may be located in a front part (e.g., first few symbols) of the TTI. In such embodiments, the DMRS at the front part of the TTI may enable early completion of the channel estimation process by the receiver, and the demodulation process of the transmission symbols may start early after channel estimation.

In various embodiments, ACK/NACK bundling may be used and there may be a single ACK/NACK bit corresponding to several CBs in a CB group. In such embodiments, a CB group ("CBG") may range from a single CB to all the CBs in a transport block ("TB"). In certain embodiments, a single NACK may be sent back to the receiver whenever any CBs within a CBG is not decoded correctly, and all the CBs in a NACKed CBG may be retransmitted (as the transmitter cannot tell which CB was not correctly received).

Figure 3:
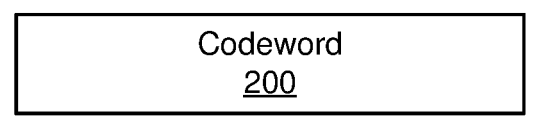

FIG. 3 is a schematic block diagram illustrating one embodiment of a codeword 200. The codeword 200 contains encoded data generated by an encoder for wireless transmission. The codeword 200 may include multiple elements.

Figure 4:
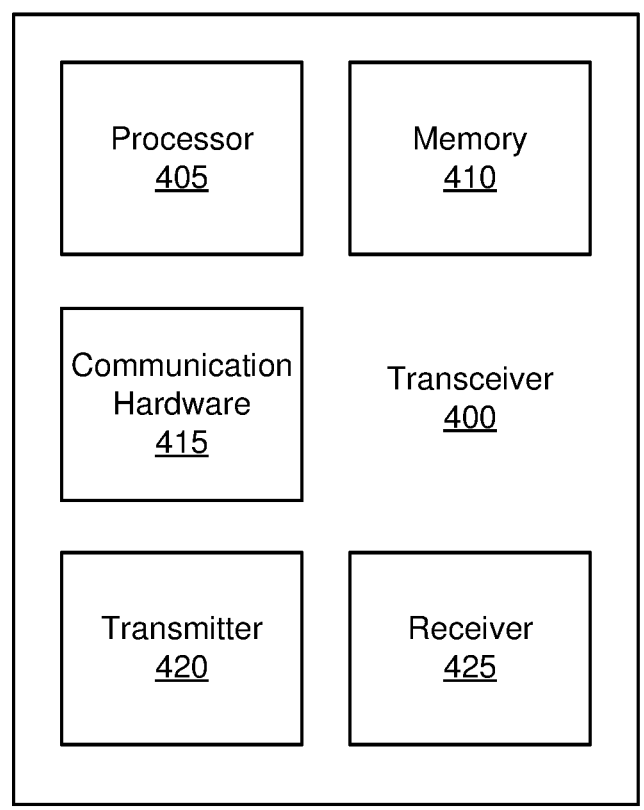
FIG. 4 is a schematic block diagram illustrating one embodiment of a transceiver for transmitting and/or receiving interleaved sequential data in time and frequency domains.

FIG. 4 is a schematic block diagram illustrating one embodiment of a transceiver 400 for transmitting and/or receiving interleaved sequential data in time and frequency domains. The transceiver 400 may be embodied in the mobile device 110. Alternatively, the transceiver 400 may be embodied in the base station 120. In the depicted embodiment, the transceiver 400 includes a processor 405, a memory 410, communication hardware 415, a transmitter 420, and a receiver 425. The memory 410 may be a semiconductor storage device, an optical storage device, micromechanical storage device, a magnetic storage device, or combinations thereof. The memory 410 may store code. The processor 405 may execute the code. The communication hardware 415 may direct data within the mobile device 110 and/or base station 120.

Figure 5:
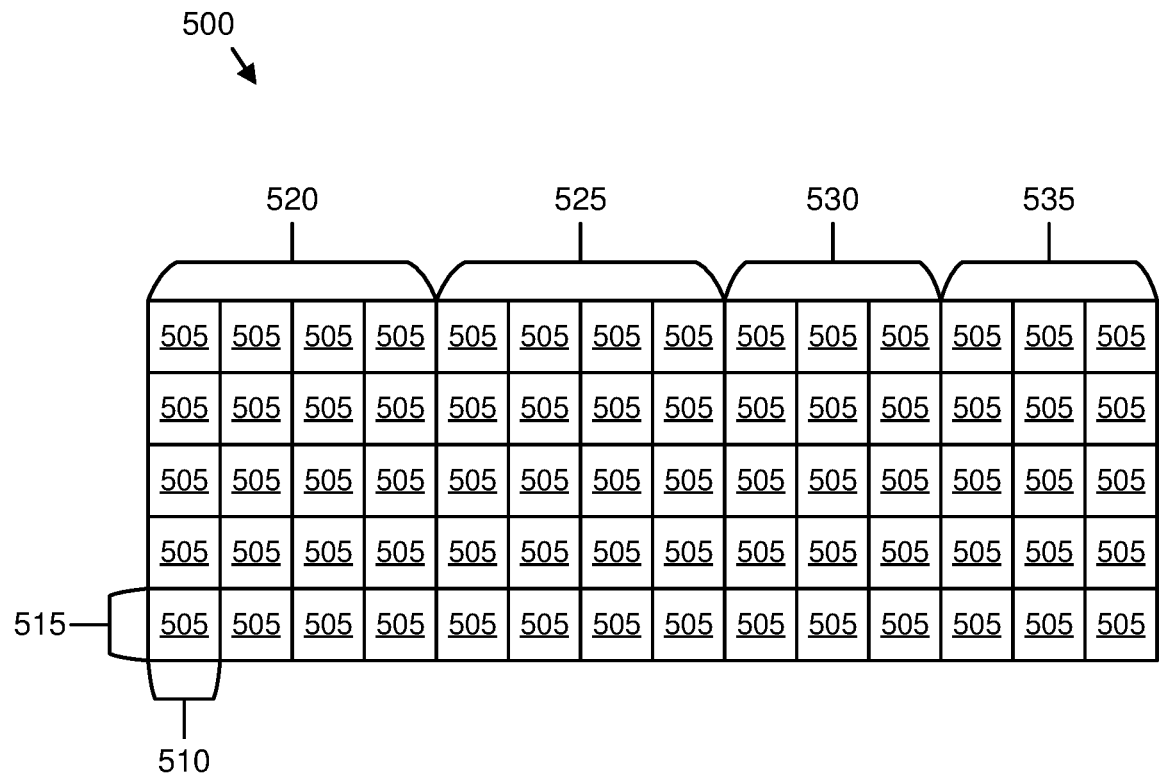
FIG. 5 is a schematic block diagram illustrating one embodiment of code block groups.

FIG. 5 is a schematic block diagram illustrating one embodiment of code block groups 500. Resource groups 505 are illustrated. Each resource group 505 (e.g., CB) in the illustrated embodiment has a time domain span 510 and a frequency domain span 515. Moreover, each resource group 505 may also include a spatial domain span. In some embodiments, the time domain span 510 may be one OFDM symbol; while in other embodiments, the time domain span 510 may be more than one OFDM symbol. In various embodiments, the frequency domain span 515 may be one or more subcarriers and/or one or more PRBs. In certain embodiments, the spatial domain span may include 1, 2, 4, or 8 layers; while in other embodiments, the spatial domain span may include any suitable number of layers. Code block groups ("CBGs") 520, 525, 530, and 535 may be formed by any suitable combination of resource groups 505 and/or any suitable number of resource groups 505. Although the CBGs 520, 525, 530, and 535 are illustrated as having adjacent resource groups 505 in the time domain and in the frequency domain, the CBGs 520, 525, 530, and 535 may include resource groups 505 that are not adjacent in the time domain and/or in the frequency domain, as described by various examples herein. As may be appreciated, the resource mapping described herein may apply, in various embodiments, to PDSCH and/or PUSCH.

In various embodiments, because a single ACK/NACK bit may be used for feedback of the decoding status of all the CBs in a CBG, retransmission of the CBG may be triggered by failure to decode at least a CB in the CBG. In such an embodiment, a large number of resources may be wasted if most of the CBs in a CBG are decoded successfully, but one or a few CBs fail to decode. Moreover, using the single ACK/NACK may work best in response to all the CBs in a CBG being strongly correlated (e.g., they are either all decoded successfully or all decoded unsuccessfully). If all of the CBs in a CBG succeed or fail in the decoding simultaneously, there may be no unnecessary retransmission of CBs. There will be no CBs that are decoded successfully but have to be retransmitted due to a failed CB in the same CBG. In various embodiments, to facilitate all of the CBs in a CBG succeeding or failing to be decoded, all of the CBs in a CBG may be subject to the same channel condition and the same interference condition. Such embodiments may be achieved by mapping all the CBs in a CBG evenly throughout a resource region (e.g., a time domain, a frequency domain, and/or a spatial domain), making any strong interference or puncturing such as URLLC transmission, as well as deep fading caused by the channel, act evenly on all the CBs. In some embodiments, a number of resource groups 505 (resource regions) correspond to a number of CBGs in a TB. In each CBG 520, 525, 530, and 535, REs in each resource group 505 are mapped to modulation symbol in the resource group 505 via an RE mapping scheme. For example, a 2-dimensional interleaving pattern may be used in a time-frequency domain or a 3-dimensional interleaving pattern may be used in a time-frequency-spatial domain. The 2-dimensional or 3-dimensional interleaving pattern may spread the modulation symbols of a resource group 505 to the REs in that resource group 505. The number of resource groups 505 in each CBG 520, 525, 530, and 535, the time domain span 510 of each resource group 505, and/or the frequency domain span 515 of each resource group 505 may be defined using RRC signaling.

In one embodiment, each CBG 520, 525, 530, and 535 spans at least two adjacent resource groups 505 in the time domain with each resource group 505 having a time domain span 510 of one OFDM symbol. In such an embodiment, each CBG 520, 525, 530, and 535 spans all of the allocated PRBs and all of the spatial layers allocated for the transmission of the TB. For example, the CBG 520 may include OFDM symbols 0-3, all the assigned PRBs in the frequency domain, and all of the spatial layers in the spatial domain. In another example, the CBG 525 may include OFDM symbols 4-7, all the assigned PRBs in the frequency domain, and all of the spatial layers in the spatial domain. In a further example, the CBG 530 may include OFDM symbols 8-10, all the assigned PRBs in the frequency domain, and all of the spatial layers in the spatial domain. In yet another example, the CBG 535 may include OFDM symbols 11-13, all the assigned PRBs in the frequency domain, and all of the spatial layers in the spatial domain.

In another embodiment, each CBG 520, 525, 530, and 535 spans at least two adjacent resource groups 505 in the time domain with each resource group 505 having a time domain span 510 of one OFDM symbol. In such an embodiment, each CBG 520, 525, 530, and 535 spans a subset of the allocated PRBs and all of the spatial layers allocated for the transmission of the TB.

In various embodiments, the number of resource groups 505 in a CBG may be determined by the available REs, the number of spatial layers, the average SINR at the receiver, and/or the size of the resource groups 505. As may be appreciated, because all the resource groups 505 experience similar average SINR through an interleaving scheme, a single MCS rate may apply to all the resource groups 505. In some embodiments, rate matching may be used to make the resource groups 505 in a CBG (or potentially the last resource group 505 in a CBG) use all the available resources in the assigned CBG. In certain embodiments, a table may be defined to determine the number of resource groups 505 and their respective size based on the total number of information bits in a CBG, the amount of resources, and/or the MCS rate.

In some embodiments, multiple CBG configurations may be defined by RRC signaling. In various embodiments, dynamic indications may be transmitted (e.g., in PDCCH DCI) to signal to a mobile device 110 which configuration of multiple CBG configurations to use.

In various embodiments, because all the modulation symbols of a resource group 505 are contained within a corresponding CBG, a decoder may start decoding all the resource groups 505 in a CBG after the last OFDM symbol of the CBG is received, provided the channel estimation based on RS is complete in time. In such embodiments, fast decoding at the receiver side may be enabled.

In certain embodiments, the resource groups 505 are mapped to the CBGs 520, 525, 530, and 535. Moreover, modulation symbols in each resource group 505 may be evenly mapped within the resource group 505. Such mapping may facilitate a maximum time and frequency diversity of a resource group 505 in a CBG. Accordingly, all the resource groups 505 in a CBG may experience the same channel fading (e.g., in the time and frequency domains), and may experience equal degradation from interference from URLLC transmissions. Therefore, the decoding success probabilities of all the resource groups 505 in a CBG may be highly correlated. This may facilitate reducing the probability that only some resource groups 505 in a CBG are successfully decoded, but the transmitter may be forced to retransmit all the resource groups 505 in the CBG due to ACK/NACK bundling at the CBG level. Moreover, the performance of CBG-based retransmission and system throughput may be improved.

Figure 6:
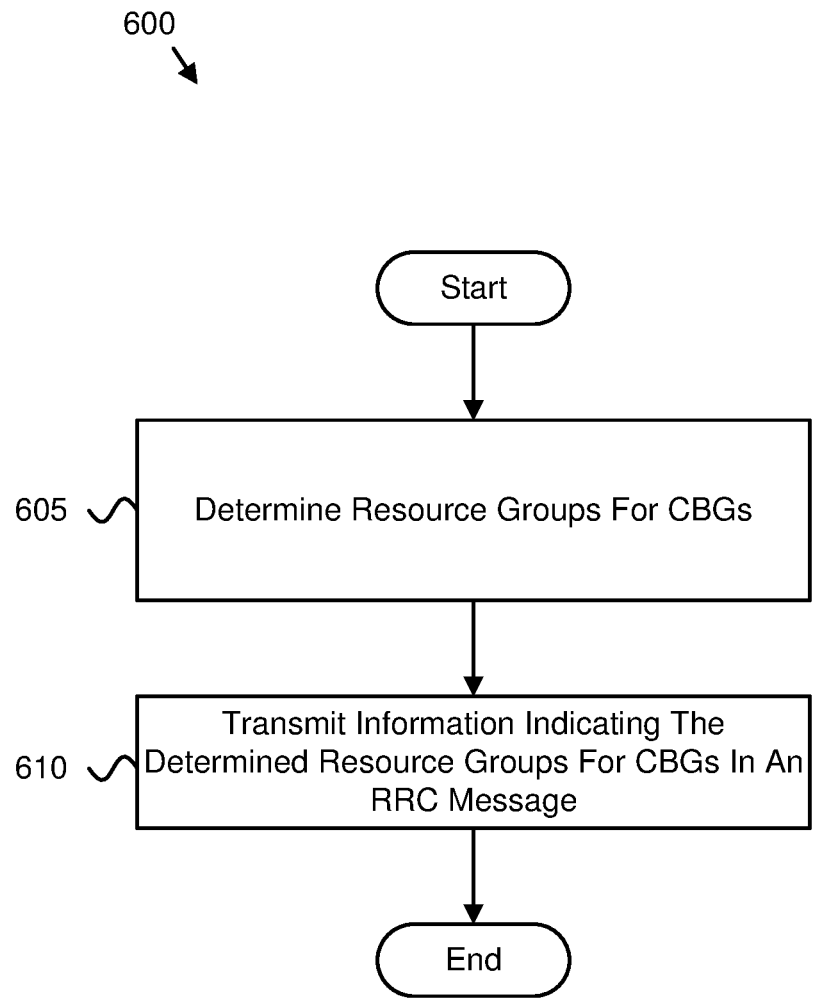
FIG. 6 is a schematic flow chart diagram illustrating one embodiment of a method for indicating resource groups for code block groups in RRC.

FIG. 6 is a schematic flow chart diagram illustrating one embodiment of a method 600 for indicating resource groups for code block groups in RRC. In some embodiments, the method 600 is performed by an apparatus, such as the base station 120 (or the mobile device 110). In certain embodiments, the method 600 may be performed by a processor executing program code, for example, a microcontroller, a microprocessor, a CPU, a GPU, an auxiliary processing unit, a FPGA, or the like.

In certain embodiments, the method 600 includes determining 605 (e.g., by a gNB) resource groups (e.g., resource groups 505) for CBGs (e.g., CBGs 520, 525, 530, and 535). In some embodiments, the method 600 may include forming an RRC message that includes the determined resource groups for CBGs. In various embodiments, the method 600 includes transmitting 610 information indicating the determined resource groups for CBGs in an RRC message (e.g., transmitting the RRC message that indicates the resource groups for CBGs to a UE).

Figure 7:
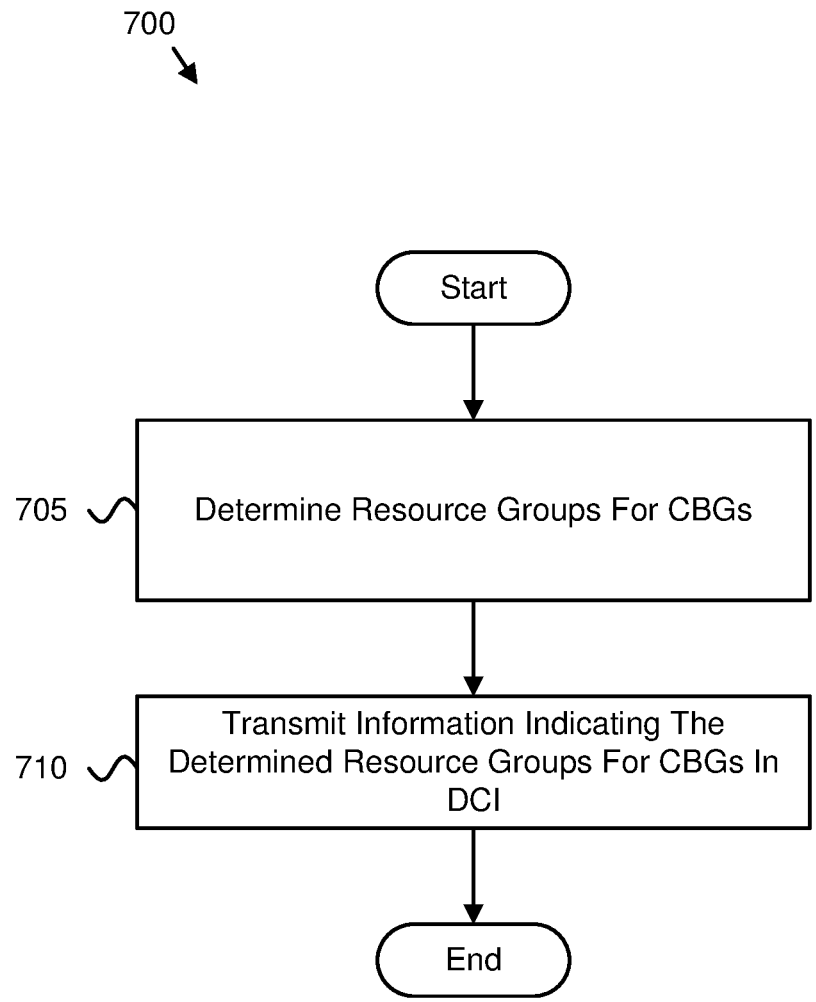
FIG. 7 is a schematic flow chart diagram illustrating one embodiment of a method for indicating resource groups for code block groups in DCI.

FIG. 7 is a schematic flow chart diagram illustrating one embodiment of a method for indicating resource groups for code block groups in DCI. In some embodiments, the method 700 is performed by an apparatus, such as the base station 120 (or the mobile device 110). In certain embodiments, the method 700 may be performed by a processor executing program code, for example, a microcontroller, a microprocessor, a CPU, a GPU, an auxiliary processing unit, a FPGA, or the like.

In certain embodiments, the method 700 includes determining 705 (e.g., by a gNB) resource groups (e.g., resource groups 505) for CBGs (e.g., CBGs 520, 525, 530, and 535). In various embodiments, the method 700 includes transmitting 710 information indicating the determined resource groups for CBGs in DCI (e.g., PDCCH DCI). In such embodiments, the information indicated the determined resource groups for CBGs dynamically indicates to a UE which resource groups to use in PDSCH and/or PUSCH.

Figure 8:
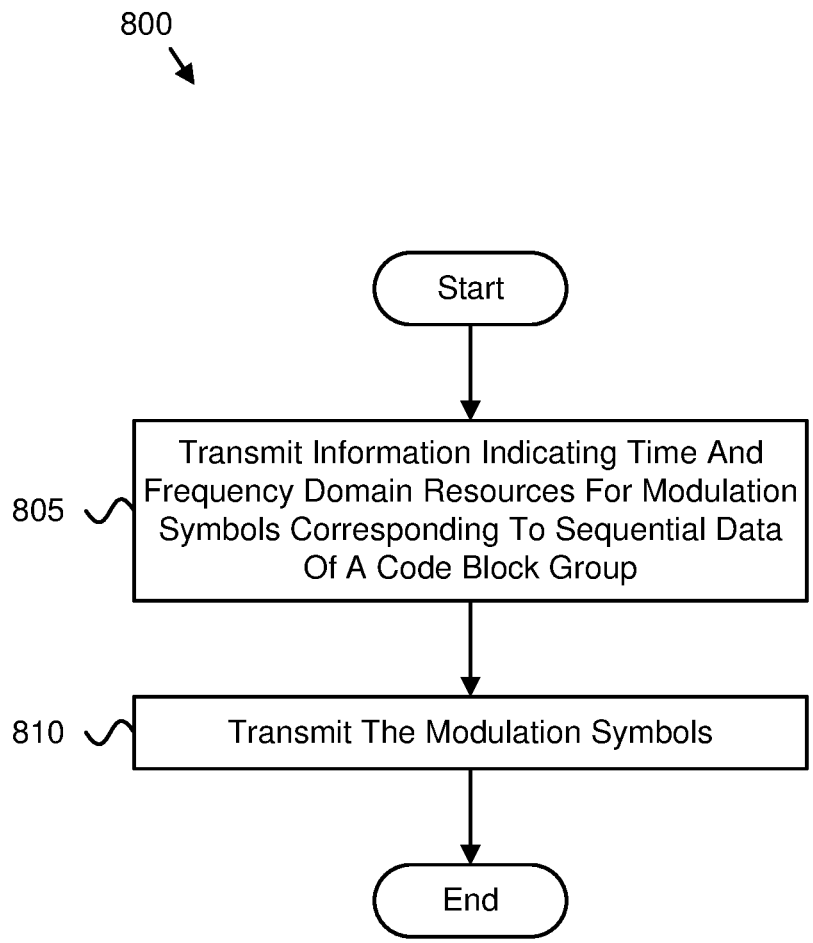
FIG. 8 is a schematic flow chart diagram illustrating one embodiment of a method for indicating resources for transmitting modulation symbols.

FIG. 8 is a schematic flow chart diagram illustrating one embodiment of a method 800 for indicating resources for transmitting modulation symbols. In some embodiments, the method 800 is performed by an apparatus, such as the base station 120 (or the mobile device 110). In certain embodiments, the method 800 may be performed by a processor executing program code, for example, a microcontroller, a microprocessor, a CPU, a GPU, an auxiliary processing unit, a FPGA, or the like.

The method 800 may include transmitting 805 information indicating time and frequency domain resources for modulation symbols corresponding to sequential data of a code block group. In various embodiments, the method 800 includes transmitting 810 the modulation symbols.

In one embodiment, the information is indicated by radio resource control signaling, downlink control information signaling, or a combination thereof. In a further embodiment, the information includes resource group configurations indicated by radio resource control signaling and a selected resource group configuration indicated by downlink control information signaling.

In certain embodiments, the modulation symbols occupy a portion of the time resources in a transmission block and all frequency resources in the transmission block. In various embodiments, the portion of the time resources includes at least two adjacent orthogonal frequency division multiplexed symbols. In some embodiments, the portion of the time resources includes adjacent time resources.

In one embodiment, the modulation symbols occupy all spatial resources in the transmission block. In such embodiments, the modulation symbols occupy a portion of the time resources in a transmission block and a portion of the frequency resources in the transmission block. In a further embodiment, the portion of the time resources includes adjacent time resources. In certain embodiments, the portion of the time resources includes at least two adjacent orthogonal frequency division multiplexed symbols.

In various embodiments, the modulation symbols occupy a portion of the spatial resources in the transmission block. In some embodiments, the portion of the frequency resources includes at least one physical resource block. In certain embodiments, the sequential data includes a first data having a corresponding first modulation symbol occupying a first time-frequency resource and a second data having a corresponding second modulation symbol occupying a second time-frequency resource. The sequential data may be mapped and/or interleaved using any suitable manner, such as a time-frequency interleaving scheme, a time interleaving scheme, a frequency interleaving scheme, or another type of mapping.

Figure 9:
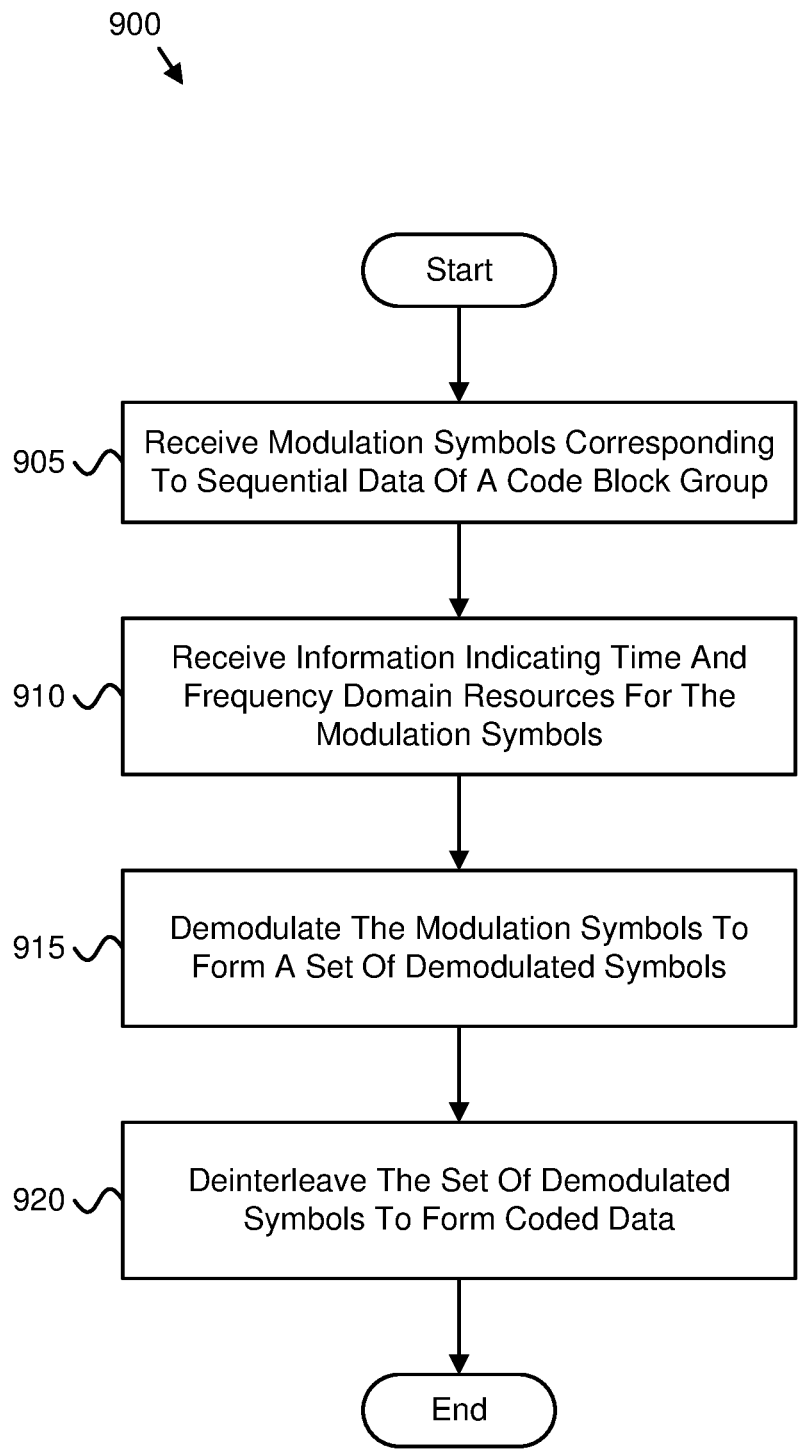
FIG. 9 is a schematic flow chart diagram illustrating another embodiment of a method for receiving modulation symbols.

FIG. 9 is a schematic flow chart diagram illustrating one embodiment of a method 900 for receiving modulation symbols. In some embodiments, the method 900 is performed by an apparatus, such as the mobile device 110 (or the base station 120). In certain embodiments, the method 900 may be performed by a processor executing program code, for example, a microcontroller, a microprocessor, a CPU, a GPU, an auxiliary processing unit, a FPGA, or the like.

The method 900 may include receiving 905 modulation symbols corresponding to sequential data of a code block group. In certain embodiments, the method 900 includes receiving 910 information indicating time and frequency domain resources for the modulation symbols. In some embodiments, the method 900 includes demodulating 915 the modulation symbols to form a set of demodulated symbols. In some embodiments, the method 900 includes deinterleaving 920 the set of demodulated symbols to form coded data.

In certain embodiments, the method 700 includes decoding the coded data. In various embodiments, the information is indicated by radio resource control signaling, downlink control information signaling, or a combination thereof.

In some embodiments, the information includes resource group configurations indicated by radio resource control signaling and a selected resource group configuration indicated by downlink control information signaling. In one embodiment, the modulation symbols occupy a portion of the time resources in a transmission block and all frequency resources in the transmission block. In a further embodiment, the portion of the time resources includes at least two adjacent orthogonal frequency division multiplexed symbols. In certain embodiments, the portion of the time resources includes adjacent time resources.

In various embodiments, the modulation symbols occupy all spatial resources in the transmission block. In some embodiments, the modulation symbols occupy a portion of the time resources in a transmission block and a portion of the frequency resources in the transmission block. In certain embodiments, the portion of the time resources includes adjacent time resources. In various embodiments, the portion of the time resources includes at least two adjacent orthogonal frequency division multiplexed symbols. In some embodiments, the modulation symbols occupy a portion of the spatial resources in the transmission block. In certain embodiments, the portion of the frequency resources includes at least one physical resource block. In certain embodiments, the sequential data includes a first data having a corresponding first modulation symbol occupying a first time-frequency resource and a second data having a corresponding second modulation symbol occupying a second time-frequency resource. The sequential data may be mapped and/or interleaved using any suitable manner, such as a time-frequency interleaving scheme, a time interleaving scheme, a frequency interleaving scheme, or another type of mapping.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining a first plurality of code blocks to be included in a first code block group, wherein a number of code blocks of the first plurality of code blocks is determined using a number of available resource elements and a number of spatial layers;
    determining a second plurality of code blocks to be included in a second code block group, wherein a number of code blocks of the second plurality of code blocks is determined using the number of available resource elements and the number of spatial layers;
    transmitting first information indicating first time domain resources and first frequency domain resources for first modulation symbols corresponding only to sequential data of the entire first code block group, wherein the first code block group comprises the first plurality of code blocks and the first information indicates that the first plurality of code blocks are included in the first code block group, the first frequency domain resources comprise a first plurality of physical resource blocks in a frequency domain, and each physical resource block of the first plurality of physical resource blocks comprises a first plurality of subcarriers, wherein:
        the first time domain resources are first adjacent time domain resources such that each time domain resource of the first time domain resources are next to one another;
        the first frequency domain resources are first adjacent frequency domain resources such that each frequency domain resource of the first frequency domain resources are next to one another;
        the first adjacent time domain resources and the first adjacent frequency domain resources are only occupied by the first modulation symbols corresponding to the sequential data of the first code block group; and
        the first modulation symbols corresponding only to the sequential data of the entire first code block group only occupy the first adjacent time domain resources and the first adjacent frequency domain resources to facilitate a high correlation for decoding the first modulation symbols;
    transmitting second information indicating second time domain resources and second frequency domain resources for second modulation symbols corresponding only to sequential data of the entire second code block group, wherein the second code block group comprises the second plurality of code blocks, the second information indicates that the second plurality of code blocks are included in the second code block group, second code block group is different from the first code block group, the second frequency domain resources comprise a second plurality of physical resource blocks in the frequency domain, and each physical resource block of the second plurality of physical resource blocks comprises a second plurality of subcarriers, wherein:
        the second time domain resources are second adjacent time domain resources such that each time domain resource of the second time domain resources are next to one another;
        the second frequency domain resources are second adjacent frequency domain resources such that each frequency domain resource of the second frequency domain resources are next to one another;
        the second adjacent time domain resources and the second adjacent frequency domain resources are only occupied by the second modulation symbols corresponding to the sequential data of the second code block group; and
        the second modulation symbols corresponding only to the sequential data of the entire second code block group only occupy the second adjacent time domain resources and the second adjacent frequency domain resources to facilitate a high correlation for decoding the second modulation symbols; and
    transmitting the first modulation symbols and the second modulation symbols based on the first information and the second information.

2. The method of claim 1, wherein the first information is indicated by radio resource control signaling, downlink control information signaling, or a combination thereof.

3. The method of claim 1, wherein the first information comprises resource group configurations indicated by radio resource control signaling and a selected resource group configuration indicated by downlink control information signaling.

4. The method of claim 1, wherein the first modulation symbols occupy a portion of the time resources in a transmission block and all frequency resources in the transmission block.

5. The method of claim 4, wherein the portion of the time resources comprises at least two adjacent orthogonal frequency division multiplexed symbols.

6. The method of claim 4, wherein the first modulation symbols occupy all spatial resources in the transmission block.

7. The method of claim 1, wherein the first modulation symbols occupy a portion of the time resources in a transmission block and a portion of the frequency resources in the transmission block.

8. The method of claim 7, wherein the portion of the time resources comprises at least two adjacent orthogonal frequency division multiplexed symbols.

9. The method of claim 7, wherein the first modulation symbols occupy a portion of the spatial resources in the transmission block.

10. The method of claim 7, wherein the portion of the frequency resources comprises at least one physical resource block.

11. The method of claim 1, wherein the sequential data of the first code block group comprises a first data having a corresponding first modulation symbol occupying a first time-frequency resource and a second data having a corresponding second modulation symbol occupying a second time-frequency resource.

12. An apparatus comprising:
    a processor that:
        determines a first plurality of code blocks to be included in a first code block group, wherein a number of code blocks of the first plurality of code blocks is determined using a number of available resource elements and a number of spatial layers; and determines a second plurality of code blocks to be included in a second code block group, wherein a number of code blocks of the second plurality of code blocks is determined using based at least partly on the number of available resource elements and the number of spatial layers; and a transmitter that:

transmits first information indicating first time domain resources and first frequency domain resources for first modulation symbols corresponding only to sequential data of the entire first code block group, wherein the first code block group comprises the first plurality of code blocks and the first information indicates that the first plurality of code blocks are included in the first code block group, the first frequency domain resources comprise a first plurality of physical resource blocks in a frequency domain, and each physical resource block of the first plurality of physical resource blocks comprises a first plurality of subcarriers, wherein:

the first time domain resources are first adjacent time domain resources such that each time domain resource of the first time domain resources are next to one another;

the first frequency domain resources are first adjacent frequency domain resources such that each frequency domain resource of the first frequency domain resources are next to one another;

the first adjacent time domain resources and the first adjacent frequency domain resources are only occupied by the first modulation symbols corresponding to the sequential data of the first code block group; and the first modulation symbols corresponding only to the sequential data of the entire first code block group only occupy the first adjacent time domain resources and the first adjacent frequency domain resources to facilitate a high correlation for decoding the first modulation symbols;

transmits second information indicating second time domain resources and second frequency domain resources for second modulation symbols corresponding only to sequential data of the entire second code block group, wherein the second code block group comprises the second plurality of code blocks, the second information indicates that the second plurality of code blocks are included in the second code block group, second code block group is different from the first code block group, the second frequency domain resources comprise a second plurality of physical resource blocks in the frequency domain, and each physical resource block of the second plurality of physical resource blocks comprises a second plurality of subcarriers, wherein:

the second time domain resources are second adjacent time domain resources such that each time domain resource of the second time domain resources are next to one another;

the second frequency domain resources are second adjacent frequency domain resources such that each frequency domain resource of the second frequency domain resources are next to one another;

the second adjacent time domain resources and the second adjacent frequency domain resources are only occupied by the second modulation symbols corresponding to the sequential data of the second code block group; and the second modulation symbols corresponding only to the sequential data of the entire second code block group only occupy the second adjacent time domain resources and the second adjacent frequency domain resources to facilitate a high correlation for decoding the second modulation symbols; and transmits the first modulation symbols and the second modulation symbols based on the first information and the second information.

13. An apparatus comprising:

a receiver that:

receives first modulation symbols corresponding only to sequential data of an entire first code block group, wherein a first plurality of code blocks to be included in the entire first code block group, wherein a number of code blocks of the first plurality of code blocks is determined using a number of available resource elements and a number of spatial layers;

receives second modulation symbols corresponding only to sequential data of an entire second code block group, wherein a second plurality of code blocks to be included in the entire second code block group, wherein a number of code blocks of the second plurality of code blocks is determined using the number of available resource elements and the number of spatial layers;

receives first information indicating first time domain resources and first frequency domain resources for the first modulation symbols, wherein the first code bock group comprises the first plurality of code blocks and the first information indicates that the first plurality of code blocks are included in the first code block group, the first frequency domain resources comprise a first plurality of physical resource blocks in a frequency domain, and each physical resource block of the first plurality of physical resource blocks comprises a first plurality of subcarriers, wherein:

the first time domain resources are first adjacent time domain resources such that each time domain resource of the first time domain resources are next to one another;

the first frequency domain resources are first adjacent frequency domain resources such that each frequency domain resource of the first frequency domain resources are next to one another;

the first adjacent time domain resources and the first adjacent frequency domain resources are only occupied by the first modulation symbols corresponding to the sequential data of the first code block group; and the first modulation symbols corresponding only to the sequential data of the entire first code block group only occupy the first adjacent time domain resources and the first adjacent frequency domain resources to facilitate a high correlation for decoding the first modulation symbols;

receives second information indicating second time domain resources and second frequency domain resources for the second modulation symbols, wherein the second code block group comprises the second plurality of code blocks, the second information indicates that the second plurality of code blocks are included in the second code block group, second code block group is different from the first code block group, the second frequency domain resources comprise a second plurality of physical resource blocks in the frequency domain, and each physical resource block of the second plurality of physical resource blocks comprises a second plurality of subcarriers, wherein:

the second time domain resources are second adjacent time domain resources such that each time domain resource of the second time domain resources are next to one another;

the second frequency domain resources are second adjacent frequency domain resources such that each frequency domain resource of the second frequency domain resources are next to one another;

the second adjacent time domain resources and the second adjacent frequency domain resources are only occupied by the second modulation symbols corresponding to the sequential data of the second code block group; and the second modulation symbols corresponding only to the sequential data of the entire second code block group only occupy the second adjacent time domain resources and the second adjacent frequency domain resources to facilitate a high correlation for decoding the second modulation symbols; and a processor that:
   demodulates the first modulation symbols and the second modulation symbols to form a set of demodulated symbols; and
   deinterleaves the set of demodulated symbols to form coded data.

14. The apparatus of claim 13, wherein the processor decodes the coded data.

15. The apparatus of claim 13, wherein the first information is indicated by radio resource control signaling, downlink control information signaling, or a combination thereof.

16. The apparatus of claim 13, wherein the first information comprises resource group configurations indicated by radio resource control signaling and a selected resource group configuration indicated by downlink control information signaling.

17. The apparatus of claim 13, wherein the first modulation symbols occupy a portion of the time resources in a transmission block and all frequency resources in the transmission block.

18. The apparatus of claim 13, wherein the first modulation symbols occupy a portion of the time resources in a transmission block and a portion of the frequency resources in the transmission block.

* * * * *